United States Patent [19]

Nagler et al.

[11] Patent Number: 5,043,978

[45] Date of Patent: Aug. 27, 1991

[54] CIRCUIT ARRANGEMENT FOR TELECOMMUNICATIONS EXCHANGES

[75] Inventors: Werner Nagler, Hohenschaeftlarn; Fritz Hlawa, Deisenhofen; Lothar Schmidt, Fuerstenfeldbruck, all of Fed. Rep. of Germany

[73] Assignee: Siemens Aktiengesellschaft, Berlin and Munich, Fed. Rep. of Germany

[21] Appl. No.: 410,684

[22] Filed: Sep. 21, 1989

[30] Foreign Application Priority Data

Sep. 22, 1988 [DE] Fed. Rep. of Germany ....... 3832242

[51] Int. Cl.[5] .................... H04Q 5/20; H04Q 11/04
[52] U.S. Cl. .................... 370/58.3; 370/58.2; 379/269
[58] Field of Search ............... 370/68.1, 58.1, 58.2, 370/58.3, 110.1, 105, 85.1, 16, 63; 340/825.03, 827; 379/279, 269, 273

[56] References Cited

U.S. PATENT DOCUMENTS

| | | | |
|---|---|---|---|
| 4,488,292 | 12/1984 | Troost | 370/63 |
| 4,491,944 | 1/1985 | Caizergues et al. | 370/58.3 |
| 4,499,461 | 2/1985 | Schneider | 340/825.03 |
| 4,499,575 | 2/1985 | Dupuis et al. | 370/58.3 |
| 4,694,452 | 9/1987 | Beckinger et al. | 370/68.1 |
| 4,763,316 | 8/1988 | Schaich et al. | 370/16 |
| 4,821,263 | 4/1989 | Lundh | 370/110.1 |
| 4,839,888 | 6/1989 | Baltz et al. | 370/68.1 |
| 4,901,347 | 2/1990 | Schmidt et al. | 379/279 |
| 4,905,220 | 2/1990 | Junge et al. | 370/16 |

FOREIGN PATENT DOCUMENTS 0032451 2/1985 Japan ........................ 370/68.1
0835406 3/1984 South Africa .

OTHER PUBLICATIONS

Telecom Report, 1981, vol. 4, pp. 4–66.

Primary Examiner—Douglas W. Olms
Assistant Examiner—Alpus H. Hsu
Attorney, Agent, or Firm—Adel A. Ahmed

[57] ABSTRACT

In a circuit arrangement for telecommunications exchanges, including PCM time division multiplex telephone exchanges with a central switching array and connected subordinate switching arrays, line terminal groups connected to a central switching network by way of link connections where each line terminal group has its own subordinate switching array and a group control unit are arranged in pairs. Within each line terminal group, there is terminal equipment for connection of outside lines on the one hand, and on the other hand link terminating circuits for the link connections to the central switching array can also be switched from the subordinate switching array of the respective line terminal group to that of the partner line terminal group. Terminal equipment and link terminating circuits as well a subordinate control units with subordinate switching arrays are equipped with three internal power supply systems and three internal clock pulse supply systems per line terminal group. The terminal equipment, subordinate control system with subordinate switching array and link terminating circuits all operate in plesiochronous operation. In a switching operation, the clock pulse supply of the terminal equipment being switched receives its master clock pulse from the subordinate control system of the partner line terminal group.

5 Claims, 3 Drawing Sheets

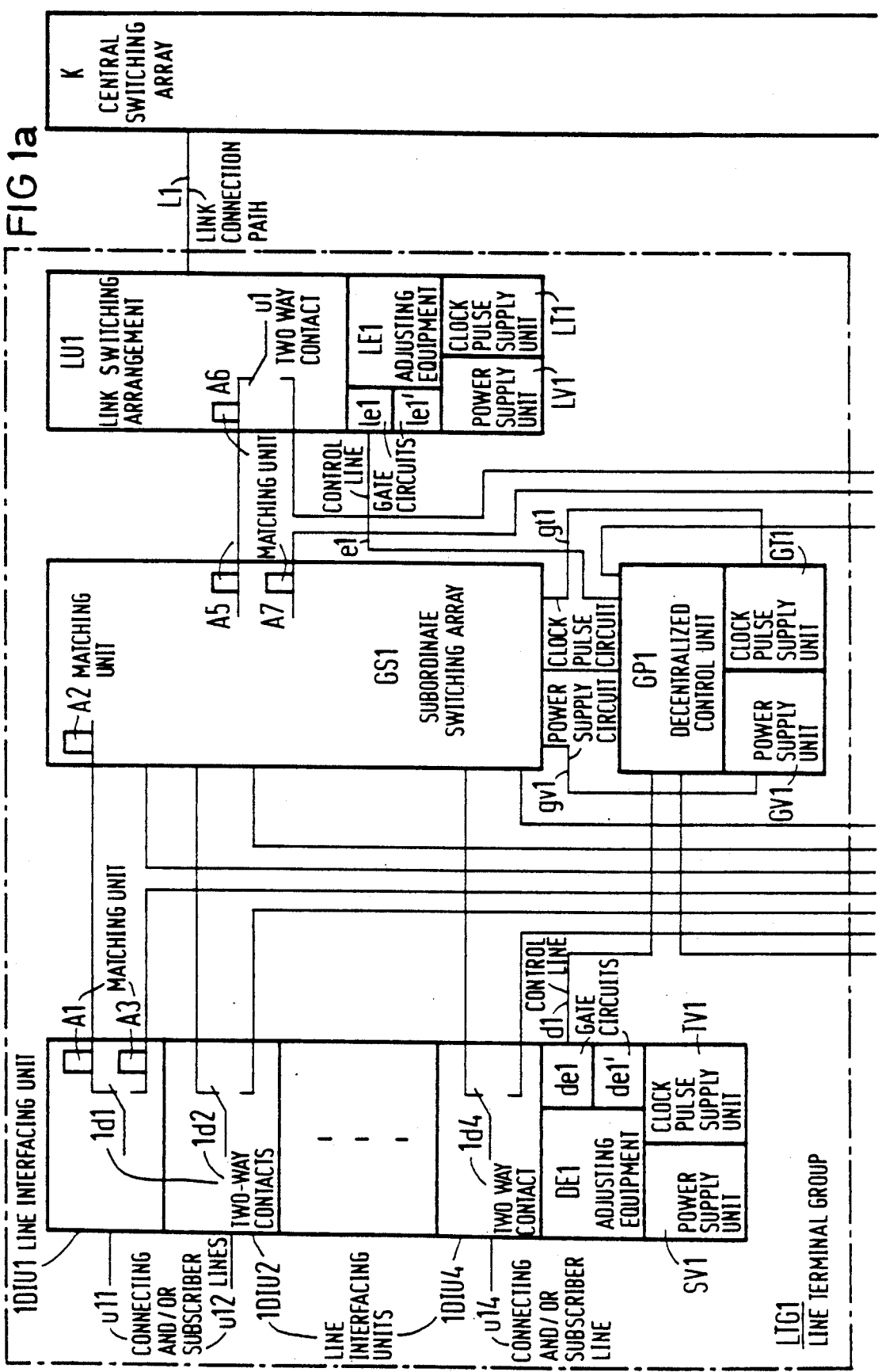

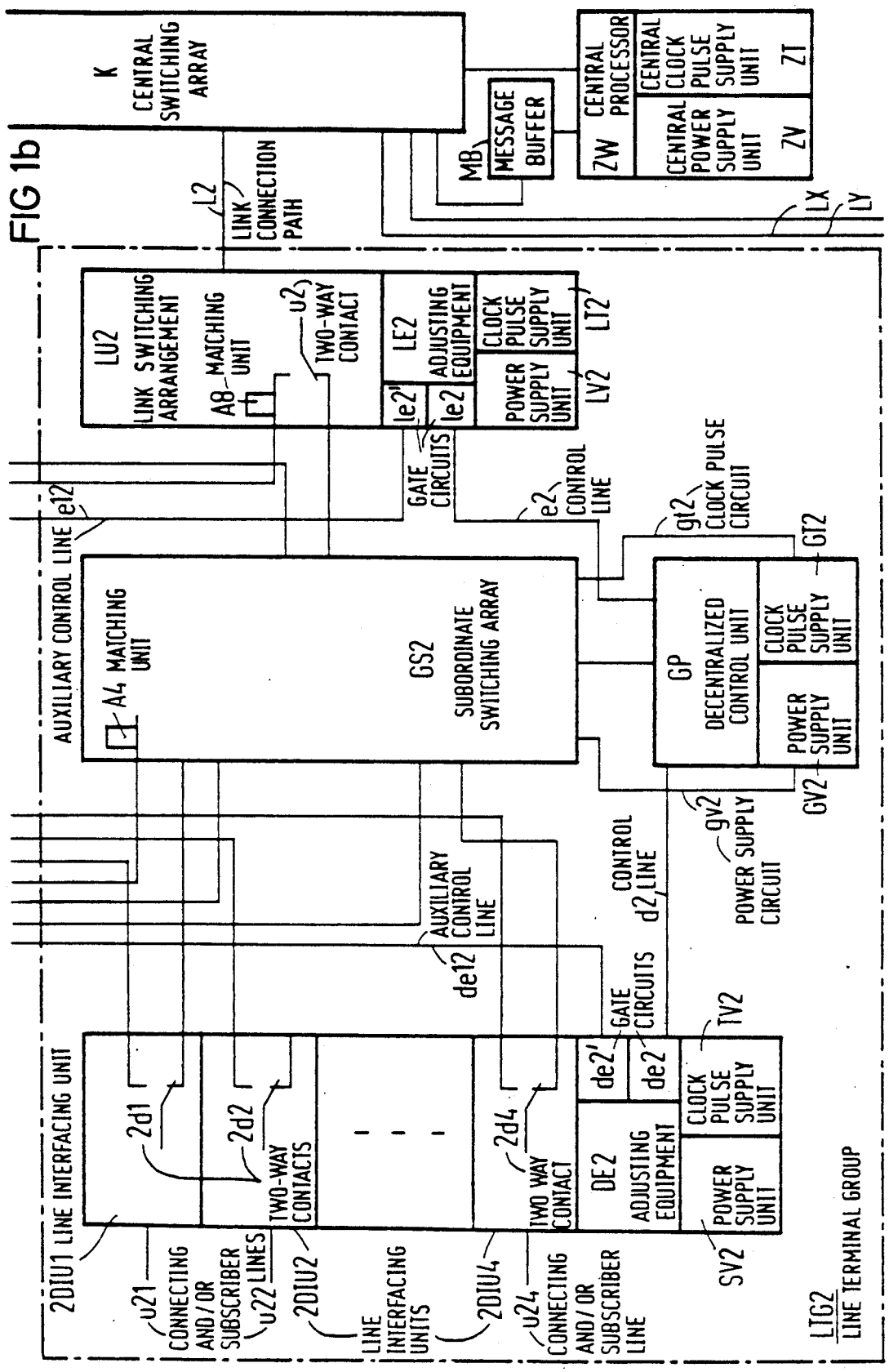

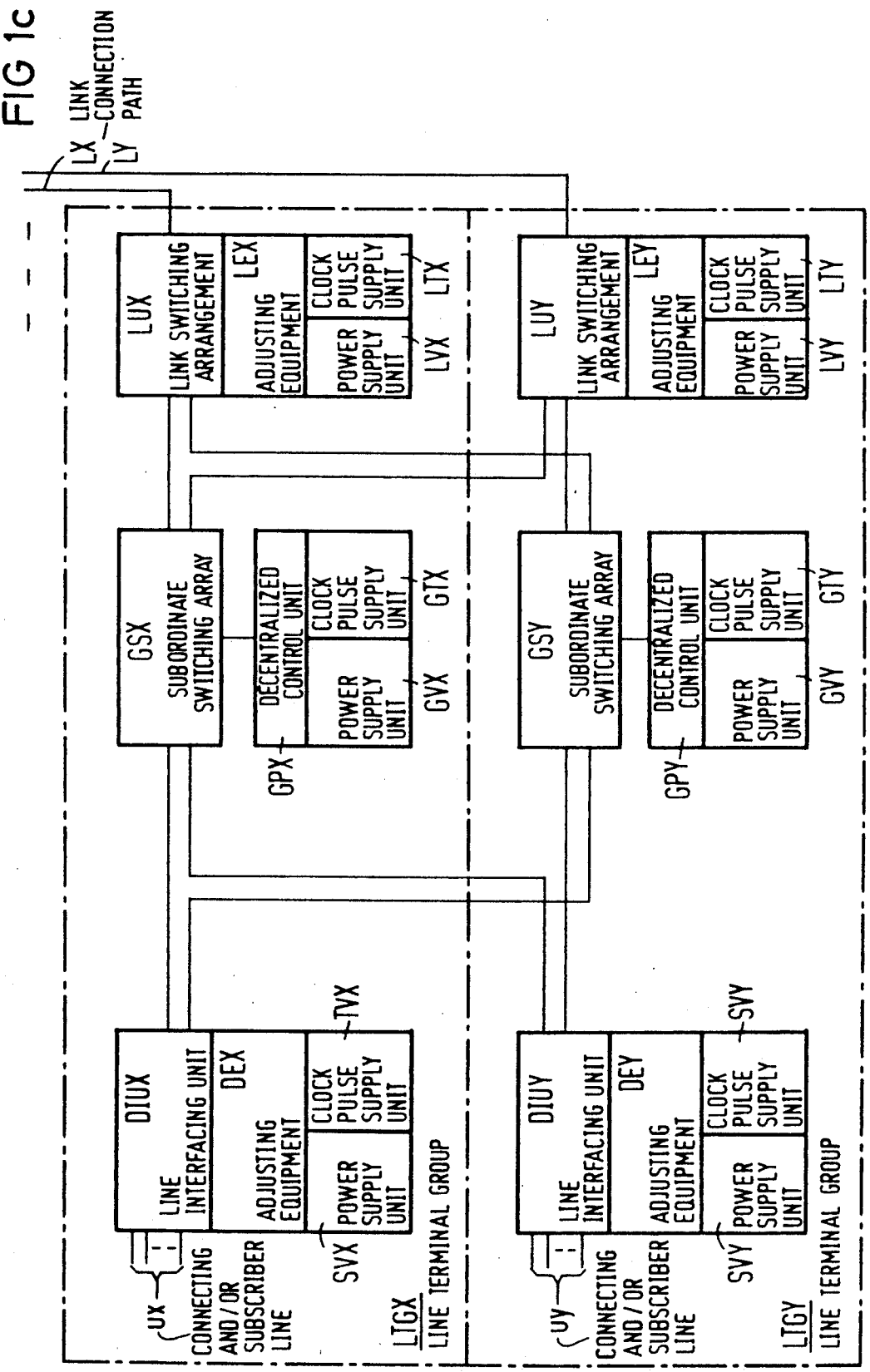

5,043,978

CIRCUIT ARRANGEMENT FOR TELECOMMUNICATIONS EXCHANGES

FIELD OF THE INVENTION

The present invention relates to a circuit arrangement for telecommunications exchanges, including PCM time division multiplex telephone exchanges, wherein a central switching array for patching through connections together with a central processor that controls it are provided and where a number of decentralized or local connection groups is each equipped with a subordinate switching array for outside connection of trunk lines and/or subscriber lines and for inside connection of link connecting paths leading to switching array terminals of the central switching array and with a decentralized control system for reception of switching signals from the aforementioned lines, for preprocessing of switching signals and for relaying switching signals to the central processor and for sending switching signals on these lines, and wherein the connection groups are arranged in pairs and where peripheral units, e.g., subscriber connection circuits, trunk line (multiple) connection circuits, etc., are provided within each pair of line terminal groups on the one hand where these line interfacing equipments are connected primarily to their subordinate switching array within the respective line terminal group and serve the function of outside connection of the subscriber lines and/or trunk lines, and link connection arrangements are provided for inside connection of the link connection pathways individually on the one hand and on the other hand they are also connected to their subordinate switching array primarily within the respective line terminal group. These line interfacing equipments can also be connected on the one hand to the outside and on the other hand to the inside to the subordinate switching array of the other line terminal group, i.e., of the second (partner) line terminal group—and conversely—whereupon the corresponding switching signal processing as well as the subordinate switching array settings are also carried out by the decentralized control system in a switching operation for connections that run across a line interfacing equipment as well as a link connection circuit of the first (or second) line terminal group where the switching operation differs from the separate operation of the two respective line terminal groups.

DESCRIPTION OF RELATED ART

An arrangement of the type described above is essentially known and is disclosed in commonly-owned U.S. Pat. No. 4,905,220, which describes, for example, how the control system of one line terminal group assumes the control functions for the lines connected to the terminal equipment of both line terminal groups in a switching operation in a pair of terminal groups. The line terminal devices of the other line terminal group are then also switched to the subordinate switching array of this one line terminal group by means of a switching operation. In addition, there have been proposals (see commonly-owned U.S. Pat. No. 4,901,347) to design link circuits of the last mentioned line terminal group so that they can be switched to the subordinate switching array of the first-mentioned line terminal group, such that the link connection pathways between the central switching array and the line terminal group whose decentralized control system has just gone out of operation remain in use in the switching operation mentioned above.

A problem solution provided by the present invention is to create favorable prerequisites in a circuit arrangement of the type defined initially so that even in the event of operating disturbances in the line terminal groups—e.g., due to a disturbance or failure of the respective power supply and/or clock pulse supply systems—any direct practical effect thereof can be eliminated as much as possible and the best possible conditions are created for eliminating the causes thereof.

SUMMARY OF THE INVENTION

The present invention solves this problem by the fact that within one line terminal group first its line interfacing equipment and second its decentralized control system together with the subordinate switching array and third their link connection circuits are designed as individual components and are equipped with independent power supply units and are equipped individually with clock pulse supply units, whereof those clock pulse supply units assigned to the link connection circuits receive their master clocking from the central processor, those assigned to the decentralized control system and the subordinate switching array receive their master clocking from the clock pulse supply unit assigned to the link connection circuit of the same line terminal group and those assigned to the line interfacing equipment receive their master clocking from the decentralized control unit. With regard to such internal connections that connect one group's terminal interfacing equipment with the internal subordinate switching array within that line terminal group, the same interface conditions creating a plesiosynchronous clock system are implemented as for additional internal connections which connect the subordinate switching array of its own line terminal group to the line interfacing equipment of the respective partner line terminal group in the switching operation, and with regard to such internal connections that connect the internal link connection circuits with the internal subordinate switching array within one line terminal group, likewise the same interface conditions creating a plesiosynchronous clock system are implemented as for such additional internal connections which connect the subordinate switching array of the internal line terminal group to the link connection circuits of the respective partner line terminal group in the switching operation.

The present invention readily makes it possible to remove a decentralized control unit of a line terminal group from operation, dismantle it and replace it under the condition that the line interfacing equipment of this line terminal group as well as their link connection circuits will continue to remain in operation. If a decentralized control unit is taken out of operation, nevertheless, an uninterrupted continuing clock pulse supply is assured for the link connection circuits in switch-over service and for the line interfacing equipment allocated thereto. This is achieved by the internal clock pulse supply units for each of the line interfacing equipment of one line terminal group as well as for those of its decentralized control system with the subordinate switching array as well as for those of its link connection circuits. This is achieved in combination with the plesiosynchronous clock system in that it also comes to bear with regard to the aforementioned three components within each line terminal group, which in turn is the prerequisite for the fact that these parts are supplied by their own clock pulse supply units. The present invention can also readily permit startup of operation or resumption of operation of a decentralized control unit (conclusion of the switching operation) by the fact that in startup or resumption of operation of a decentralized control unit, no voltage sag can occur with the other parts of the same line terminal group or the various parts of the other line terminal group due to the independent power supply units. In this connection reference should also be made to the effect of the small failure unit that can be achieved in accordance with the present invention. The fact that the entire line terminal group is no longer the smallest failure unit in a breakdown in one line terminal group but instead the line interfacing equipment switched to it as well as the link connections form the smallest failure unit plus the fact that these can be switched has the effect that now the smallest failure units are line interfacing equipments, a subscriber terminal or the subscriber stations connected to one multiple subscriber station circuit.

BRIEF DESCRIPTION OF THE DRAWING

The invention is described in detail below in conjunction with the drawing, of which:

FIGS. 1a, 1b, and 1c are sections in series of one complete block diagram showing a telecommunications exchange circuit in accordance with the invention, wherein FIG. 1a shows a central switching array connected to one of a first pair of line terminal groups, FIG. 1b shows the other one of said first pair of line terminal groups, and FIG. 1c shows another pair of line terminal groups LTGX, LTGY, representing the others of a plurality of line terminal groups associated with the central switching array.

DESCRIPTION OF THE PREFERRED EMBODIMENT

FIGS. 1a to 1c show one practical non-limiting example of this invention showing only the components that contribute essentially to an understanding of this invention. The exemplary embodiment according to this invention is based on the presentation and description of a PCM telecommunications exchange as described in U.S. Pat. No. 4,763,316. The description of the practical example according to this invention thus assumes that a centrally controlled PCM time division multiplex telephone exchange system of the type presented and explained in the aforementioned European patent application is already known.

In the present case of the exemplary embodiment according to the present invention, a PCM time division telephone exchange system is also provided where a central switching array K and a central processor ZW that controls the switching array are provided for switching the connections through. The switching array and processor can be duplicated in a known way for safety reasons. Furthermore, a large number of decentralized line terminal groups LTG1 to LTGY are provided. Each line terminal group has a subordinate switching array, e.g., GS1 to GSY. The subordinate switching array of one line terminal group is used for outside connection of connecting lines and/or subscriber lines u11 to u14 and for inside connection of link connection paths leading to switching array terminals of the central switching array K. Furthermore, each line terminal group has one decentralized control unit, e.g., GP1 to GPY. The decentralized control unit of each line terminal group is used for switching signal reception from the aforementioned lines. These lines may be subscriber lines and connection lines in the form of analog lines as well as channels of carrier frequency lines and time division multiplex transmission systems.

The decentralized control unit of each line terminal group is used for receiving switching signals from the above-mentioned lines, for preprocessing of switching signals and for relaying switching signals to the central processor and also for transmission of switching signals on these lines by known methods. As in the known case, the present case also provides for the line terminal groups to be arranged in pairs. This affects the two line terminal groups LTG1 and LTG2, for example. Likewise, this also affects the two line terminal groups LTGX and LGTY.

Within each line terminal group, there are line interfacing equipments, e.g., 1 DIU1 to 1 DIU4. The same is also true for the other line terminal groups. The line interfacing equipments are used for outside connection of the aforementioned subscriber lines and/or trunk lines u1 to uy and of the corresponding channel systems. The line interfacing equipment within one line terminal group are connected primarily to their subordinate switching array within the same, namely by way of the nonoperative sides of the two-way contacts 1d1 to 2d4. Thus line interfacing equipments 1DIU1 to 1DIU4 of line terminal group LTG1 are connected primarily to their subordinate switching array GS1 by way of the nonoperative sides of the two-way contacts 1d1 to 1d4. Similarly, individually functioning link switching arrangements, e.g., LU1 in LTG1 are connected primarily to the respective subordinate switching array, e.g., GS1, within the respective line terminal group for internal connection of link connection paths L1 and L2 to the subordinate switching array. These link switching arrangements belong to the aforementioned link connection circuits, i.e., they are terminal circuits to which the link connection paths are connected. These link connection circuits also comprise the link switching arrangements so that the remaining discussion will refer only to the latter but the link connection circuits are implicitly included. Said connection is by way of the nonoperative side, e.g., of two-way contact u1. The link connection paths L1 and L2 are thus connected primarily to the respective subordinate switching arrays GS1 and GS2 on the inside by way of the link switching arrangements LU1 and LU2. This primary connection thus exists by way of the nonoperative sides of the two-way contacts u1 and u2. The link connection paths are thus designed as time division multiplex lines. The link switching arrangements LU1 and LU2 are connected to the two subordinate switching arrays by way of link connection circuits which are not shown here in detail. Each subordinate switching array is thus assigned a link connection circuit which is not shown here.

These line interfacing equipments on the one hand and the link connection circuits containing the link switching arrangements on the other hand which are primarily connected within the respective line terminal group to their subordinate switching array by way of the link connection circuit assigned to it, can also be connected on the other hand to the subordinate switching array of the other line terminal group by way of the link connection circuit assigned thereto, i.e., it can be connected to the subordinate switching array of the respective partner line terminal group. The line interfacing equipments 1DIU1 to 1DIU4 of line terminal group LTG1 can thus be connected on the outside to the subordinate switching array GS2 of the partner line terminal group LTG2 by way of the working sides of the two-way contact 1d1 to 1d4. Similarly, the link switching arrangement LU1 of link connection path L1 of line terminal group LTG1 can be connected on the inside to the subordinate switching array GS2 of line terminal group LTG2 with the help of two-way switch u1. The same is also true with regard to the exchange of the two paired line terminal groups LTG1 and LTG2.

In normal operation, the two-way contacts 1d1 to 2d4 and u1 and u2 are in the nonoperative position illustrated here. In normal operation, the two line terminal groups operate separately from each other. Therefore, this type of operation is also referred to as "separate operation." The so-called "switching operation" differs from this. For example, if two-way contacts 2d1 to 2d4 as well as two-way contact u2 are brought out of their nonoperative position illustrated here into their working position, the line interfacing equipments 2DIU1 to 2DIU4 of line terminal group LTG2 are connected on the outside to subordinate switching array GS1 of line terminal group LTG1. Likewise, contact u2 is brought out of its nonoperative position shown here into its working position so the link connection path L2 of line terminal group LTG2, which is connected by way of link switching arrangement LU2, is connected on the inside to subordinate switching array GS1 of line terminal group LTG1 by way of the link connection circuit (not shown here) which is provided in this subordinate switching array. The subordinate switching array GS2 and the decentralized control unit GP2 are taken out of operation with this switching operation. The connections are established by way of the subordinate switching array of the other line terminal group LTG1. These connections are established in switching operation by means of the decentralized control unit GP1 of the respective partner line terminal group.

As indicated in the FIGURE, first the line interfacing equipments, e.g., 1DIU1 to 1DIU4, within each line terminal group, e.g., LTG1, are designed as individual components, and second the decentralized control system, e.g., GP1, together with the subordinate switching array, e.g., GS1 is designed as an individual component, and third the link connection circuit is designed as an individual component, each of which is provided with a link switching arrangement, e.g., LU1. From the standpoint of design, these three components thus have the configuration of independent components within one line terminal group. In this regard, first the line interfacing equipments, e.g., 1DIU1 to 1DIU4, within a line terminal group, e.g., LTG1, and second the link connection circuits containing the link switching arrangement, e.g., LU1, and third the decentralized control unit GP1, together with the subordinate switching array, e.g., GS1, of this line terminal group are equipped with independent power supply units, e.g., SV1, GV1 and LV1. These power supply units can be supplied by a common source but these power supply units SV1, GV1 and LV1 are independent of each other inasmuch as the possibility of mutual influence of the systems supplied by them, e.g., due to large load transients caused by short circuit or perhaps a resultant failure, can be ruled out. For example, if the line interfacing equipments of a line terminal group are back in operation after being out of operation, such a resumption of operation cannot lead to a voltage sag in the corresponding subordinate switching array, in the corresponding decentralized control unit or in the corresponding link connection circuit including their link switching arrangement. The same is also true in reverse. In other words, startup of operation or resumption of operation in one line terminal group cannot cause a voltage sag in the power supply of the other line terminal group, i.e., the partner line terminal group. The aforementioned power supply units thus serve in a known way to provide one or more voltages for the purpose of power supply in the line interfacing equipment, decentralized control units and link switching arrangements.

Just as the line interfacing equipment of one line terminal group as well as its decentralized control unit including the subordinate switching array and the link connection circuit containing the link switching arrangement of the same line terminal group is each equipped with its own power supply unit, so clock pulse supply units are also provided individually for these three areas. Within line terminal group LTG1, the clock pulse supply unit TV1 is also assigned to line interfacing equipment 1DIU1 to 1DIU4. Clock pulse supply unit GT1 is thus assigned to the decentralized control unit GP1 together with the subordinate switching array GS1. The clock pulse supply unit LT1 is assigned individually to the respective link connection circuit (to which the link switching arrangement LU1 belongs). Similarly, the same applies to the other line terminal groups LTG2 to LTGY.

The link connection circuits also contain the aforementioned link switching arrangement, the respective power supply unit and the clock pulse supply unit. The following discussion is directed only to the respective link switching arrangement.

Within one line terminal group, e.g., LTG1, the clock pulse supply unit LT1 corresponding to its link connection circuit LU1 receives its master clocking from the central processor ZW, namely a central clock pulse supply unit ZT. This takes place by way of a control channel that is switched through to line terminal group LTG1 by way of switching array K in a known manner (see commonly-owned U.S. Pat. No. 4,499,461. Clock pulse supply units which are controlled with the help of a master clock are already known, for example, as described in Telcom Report, 1981, Vol. 4, pages 40 et seq., or in Republic of South Africa Letters Patent 83/5406 (Application No. 83 5406).

Within one line terminal group, e.g., LTG1, the clock pulse supply unit GT1 assigned to its decentralized control unit GP1 and the subordinate switching array GS1 receives its master clocking from the clock pulse supply unit LT1 corresponding to the link switching arrangement LU1. Likewise, the clock pulse supply unit TV1 assigned to the line interfacing equipment 1DIU1 to 1DIU4 receives its master clocking from clock pulse supply unit GT1 assigned to the decentralized control unit GP1.

Separate transmission pathways can be provided for relaying the master clock pulse. However, it is equally possible to transmit the master clock pulse with the help of individual connections that are patched through by essentially known methods and then to derive the master clock pulse from these connections by methods which are likewise known.

The switching operation has already been described in detail. For example, if line terminal group LTG2 is in switching operation, contacts 2d1 to 2d4 and contact u2 are moved from their nonoperative position shown here into their working position. The connections established by way of line interfacing equipment 2DIU1 to 2DIU4 and by way of the link connection circuit containing link switching arrangement LU2 are not patched through by way of subordinate switching array GS2 but instead by way of subordinate switching array GS1 of partner line terminal group LTG1. In this case the clock pulse supply unit LT2 of this link connection circuit receives its master clock pulse in the manner described above. Clock pulse supply unit TV2 of line interfacing equipments 2DIU1 to 2DIU4, however, receive the master clock pulse from the clock pulse supply unit GT1 of the decentralized control unit GP1 of the partner line terminal group LTG1 in the case of the aforementioned switching operation. And the clock pulse supply unit of the partner line terminal group receives its master clock pulse from the clock pulse supply unit LT2 of the link switching arrangement LU2. The master clock pulse is transmitted as described above.

Within one line terminal group, there are thus three independent units—as explained above—namely first the line interfacing equipment, second the decentralized control unit with the subordinate switching array and third the link connection circuit. The clock system in which these units work together is a plesiosynchronous clock system for which there are interface conditions which, when implemented, lead to a plesiosynchronous clock system. The aforementioned clock pulse supply units are switched independently of each other by master clocking in the manner described above by an essentially known method and matching equipment (compensating memory) is provided in the communications pathways by known methods and serves the function of synchronization with regard to flank and phase of the pulses transmitted per channel. These pulses are the pulses transmitted continuously in conjunction with the PCM time division multiplex technique. Such matching circuits (also known as "compensating memory") are known in numerous applications. They should always be provided in cases where pulse trains are to be received. The clock of the pulse train to be received must be synchronized with the clock that is the deciding factor within the respective component. Such clock synchronization techniques are well know, for example, as described in commonly-owned U.S. Pat. No. 4,488,292.

There are internal connections that connect the internal line interfacing equipment with the internal subordinate switching array within one line terminal group, namely by way of the nonoperative sides of the two-way contacts 1d1 to 2d4. There are other internal connections which connect the subordinate switching array of the internal line terminal group to the line interfacing equipment of the respective partner line terminal group in the switching operation, namely by way of the working sides of the two-way contacts. The interface conditions that create a plesiosynchronous clock system have now been implemented for these internal connections, namely for the internal connections within one line terminal group and for the internal connections running from the subordinate switching array of one line terminal group to the line interfacing equipment of the respective partner line terminal group. Implementation of these interface conditions which create a plesiosynchronous clock system takes place by using matching circuits on all these internal lines.

From the standpoint of the present invention, it is especially important that not only the internal lines running from the subordinate switching array of one line terminal group to the line interfacing equipment of the respective partner line terminal group be equipped with matching units that are used to implement the interface conditions creating the plesiosynchronous clock system, but also the internal connections which connect their subordinate switching arrays to their respective line interfacing equipment within each line terminal group. Due to the fact that the aforementioned matching units are provided for synchronization with regard to flank and phase of the pulses for these internal connections, the various components can have the configuration explained above per line terminal group, namely with their own power supply units and their own clock pulse supply units.

Intraconnections are also provided which connect the internal link connection circuits within one line terminal group to its own subordinate switching array, i.e., by way of the nonoperative sides of two-way switches u1 and u2. Furthermore, the same interface conditions creating a plesiosynchronous clock system are achieved with the help of matching equipment (A5, A0–A7, A8), which connect the subordinate switching array of the internal line terminal group to the link connection circuit of the respective partner line terminal group in the switching operation. Thus matching units (A5–A8) are also provided for the respective internal connections with regard to the plesiosynchronous clock system and also for working on the subordinate switching arrays on the one hand and the link connection circuits on the other hand. Synchronization with regard to flank and phase also takes place with the help of these matching units in an interaction between the subordinate switching arrays on the one hand and the link connection circuits on the other hand.

Through the measures given in the practical example described here, it thus becomes possible for the operator of a telephone exchange system to remove a decentralized control unit of a line terminal group from operation, expand it and utilize it under the condition that the terminal equipment of this line terminal group as well as its link connection circuits remains in operation. When a decentralized control system is taken out of operation, uninterrupted further clock pulse supply for the terminal equipment and link terminal circuits assigned to it (which will continue to be operated during the switching operation) is nevertheless assured. This is accomplished by the internal clock pulse supply equipment for the terminal equipment of one line terminal group and for those of its decentralized control system with a subordinate switching array as well as for those of its link connection circuits. This is accomplished in combination with the plesiosynchronous clocking system in that this also comes about with regard to the aforementioned three components within each line terminal group, which is in turn the prerequisite for these parts being supplied by their own clock pulse supply equipment. It is also easy for operation of a decentralized control system to be started up or resumed (termination of the switching operation) since no voltage sags can occur with the other parts of the same line terminal group or the different parts of the other line terminal group due to the independent power supply units on starting or resuming operation of a decentralized control system.

For the above-mentioned stopping and resumption of operation of a decentralized control unit, including its respective subordinate switching array, there are provisions for the aforementioned internal connections on the one hand and the intraconnections on the other hand to be carried over cable which can be plugged into the respective subordinate switching array and/or the terminal equipment as well as the link connection circuits. This involves the internal connections and the intraconnections within one line terminal group as well as the internal connections and intraconnections within a line terminal group pair which provide mutual connections from one line terminal group to the other.

The terminal equipment such as 2DIU1 to 2DIU4 of one line terminal group such as LTG2 as well as its link switching circuit, e.g., LU2, are provided with adjusting equipment, e.g., DE2 or LE2, which is used to receive control information from the respective decentralized control system, e.g., GP2, by way of control lines, e.g., d2 or e2, and for delivering adjustment commands to the terminal equipment or the respective link switching arrangement. The aforementioned control lines are provided with gate circuits, e.g., de2 and le2, individually at the reception end.

Reference should also be made here to the auxiliary control lines, e.g., de12 and e12, which run within one line terminal group pair, e.g., LTG1/LTG2, from the decentralized control system, e.g., GP1, of one line terminal group, e.g. LTG1, to the adjustment equipment, e.g., DE2 or LE2, of the terminal equipment, e.g., 2DIU1 to 2DIU4, and the adjustment equipment, e.g., LE2, of the link switching arrangement, e.g., LU2, of the respective other line terminal group, e.g., LTG2, and vice versa. These auxiliary control lines are used during switching operation to help control the terminal equipment as well as the link switching arrangement of the respective partner line terminal group from one decentralized control system of a line terminal group, i.e., in addition to the terminal equipment as well a the link switching arrangement of the internal line terminal group which is controlled by way of the respective control lines in a known manner.

The control lines and auxiliary control lines, only parts of which are represented here, are point-to-point connections and lead to gate circuits de1 to le2 and to other gate circuits (not shown) which are individually assigned to the control lines and which can be controlled, e.g., by way of control lines d2 and e2, by the respective internal decentralized control system, e.g., G2, in the case of the adjustment equipment, e.g., DE2 or LE2, in one line terminal group, e.g., LTG2.

It is known that not only communications connections are patched through but also signaling connections are patched through by allocation with them. One signaling channel is provided in common for a number of communications channels and is divided in time within the pulse frame in such a way that certain time segments within the pulse frame are in fixed allocation to certain communications channels. What was stated above with regard to the communications channels and communications connections regarding the matching equipment for synchronization with respect to flank and phase also applies to the signaling connections.

The auxiliary control lines, e.g., de12 and e12, as well as the above-mentioned control lines, e.g., de1 and de2 or e1 and e2, are to be designed as point-to-point connections, i.e., with no branching, in contrast with the known bus principle which is widely used. In combination with this design as point-to-point connections, the controllable known gate circuits, e.g., de1, de2, de2' or le1, le2, le2', are provided individually within the terminal equipment and link switching arrangements at the end points of these point-to-point connections, especially at each individual end point, and these gate circuits can be controlled so they are transmitting or nontransmitting by the central control system, e.g., GP1, of its own line terminal group, e.g., LTG1, and/or the respective partner line terminal group.

To implement the interface conditions that create a plesiosynchronous clock system, the internal connections and the intraconnections in the terminal equipment on the subordinate switching array (A5, A7) and in the link switching arrangement (A6, A7) are equipped with compensating memory for intermediate storage (always at the reception end) of the respective transmitted information for the purpose of adjusting the clock systems with regard to phase and pulse flank which exist within the terminal equipment, the subordinate switching arrays and the link switching arrangements. To do so, the compensating memory A1 to A8 shown in the FIGURE as well as other compensating memories (not shown) are provided and are arranged individually at the ends of the intraconnections and the internal connections at the reception end and are provided for several channels or for each channel individually.

With regard to the switching operation explained here, the terminal equipment not only has interfaces with its own subordinate switching network but also has interfaces with the subordinate switching network of its partner line terminal group. This applies to the communications pathways, the control and signalling pathways (for signalling by channel) and for the respective clock pulse systems.

To equalize the phase differences in the clock pulse systems between two paired line terminal groups, the above-mentioned compensating memories are provided on the speech channels between the line terminal groups and the subordinate switching arrays in a known manner. Under normal operating conditions the phase offset of a few hundred nanoseconds can be picked up by a time offset between read-in and readout of the speech path information at the compensating memory. This requires intermediate storage of one channel in the compensating memory. The information transit time is increased only insignificantly by this measure.

In order to compensate for frequency differences between the clock pulse systems of the two paired line terminal groups after a switch in the respective reference clock pulse due to a difference in control times, the compensating memory is designed as a complete storage for a complete information frame in a known way. Frequency deviations then lead only to an occasional frame drift depending on the frequency difference.

In normal operation, control of the compensating memory takes place according to the clock pulse by way of the respective interface to its own line terminal group or to the partner line terminal group. The speech path is patched through by way of a subordinate switching array and the line interfacing equipment of the same line terminal group. In switching operation based on routine switching, the clock pulse control takes place by way of the subordinate switching network of the respective partner line terminal group. The speech paths for the terminal equipment are also patched through by way of the subordinate switching networks of the respective partner line terminal group. In switching operation based on an error in one line terminal group, the speech connections run from the terminal equipment of that group by way of the subordinate switching array of the respective partner line terminal group. The internal clock pulse of the line interfacing equipment of the line terminal having the trouble is controlled by a control interface between it and the partner line terminal group in accordance with its clock pulse system.

The terminal equipment is selected by the subordinate control units in a 4 ms multiframe. In order to prevent errors from occurring in routine switching, this terminal equipment is supplied with a clock pulse and synchronizing pulse of the respective subordinate switching network selected and a message of 32 bytes maximum is stored temporarily in a signaling memory. The internal readout then takes place through the processor clock pulse.

Between the two paired line terminal groups there is a control channel for mutual exchange of control information. This control channel likewise transmits in a 4 ms multiframe. To avoid problems in switching, the respective interfaces as well as the signaling interface are supplied with the respective clock pulse and synchronizing pulse. In order to prevent a loss of communication in divergence of the clock pulse systems, a compensating memory is provided on the respective reception side and is read out with the internal clock pulse in the respective line terminal group.

For problem-free switching with regard to the communications to be transmitted, the measures described below are thus taken to equalize phase differences and frequency deviations. Compensating memories for phase differences between the clock pulse systems of two paired line terminal groups by means of staggered read-in and readout of the communications is provided for the terminal equipment.

The compensating memory is designed as frame storage for compensation of frequency deviations. Likewise, compensating memories such as A5, A6 are also provided in the link terminating circuits not shown individually here. For problem-free switching, the communications transmitted from line terminal groups in the direction of switching network K are sent by clock pulse-synchronized, frame-synchronized and phase-synchronized transmission. For this clock pulse matching, a compensating memory is provided in the link terminating circuits. The required information synchronism is achieved by readout of the information from the respective compensating memory with the same regenerated clock pulse of the switching network.

A clock pulse controlled information switching is provided for trouble-free information switching in each of the link switching arrangements. For intercepting frequency deviations, the compensating memory is designed as frame storage.

What is claimed is:

1. A circuit arrangement for centrally controlled telecommunications exchanges, including PCM time division multiplex telephone exchanges, wherein a central switching array for patching through connections together with a central processor for control thereof are provided and a number of decentralized line terminal groups, each with its own subordinate switching array, are provided for outside connection of trunk lines and/or subscriber lines and for inside connection of link connection paths leading to switching network connections of the central switching network and each is equipped with its own decentralized control system for receiving switching signals from said lines, for preprocessing of switching signals and for relaying switching signals to the central processor and for transmitting switching signals on said lines, and where the line terminal groups are arranged in pairs and a line interfacing equipment, including any of subscriber terminal circuits, multiple subscriber terminal circuits, trunk line terminating circuits that is connected primarily to the subordinate switching array within each line terminal group can also be connected either on the outside or on the inside to the subordinate switching array of the partner line terminal group, that is, it can be connected to the partner line terminal group for outside connection of the subscriber lines and/or trunk lines on the one hand or for inside connection of the link connection pathways individually and it can also be connected primarily within the respective line terminal group—and vice versa—whereupon the corresponding switching signal processing as well as subordinate switching network adjustment are likewise performed by the decentralized control system in a switching operation which differs from the separate operation of the respective two line terminal groups for connections running by way of one line interfacing equipment as well as a link connection circuit of one of the first-mentioned and partner line terminal group and by way of the subordinate switching array of the partner line terminal group, characterized in that within one line terminal group first its line interfacing equipment, second its decentralized control system together with the subordinate switching array and third its link connection circuits are all designed as individual components from the standpoint of structure and control and they are equipped individually with clock pulse supply units, of which those clock pulse supply units assigned to the link connection circuits receive their master clock pulse from the central processor, those assigned to the decentralized control system and the subordinate switching array receive their master clock pulse from the clock pulse supply unit assigned to the link connection circuit of the same line terminal group and those assigned to the terminal equipment receive their master clock pulse from the clock pulse supply unit assigned to the decentralized control system; with regard to such internal connections which connect one line terminal group's line terminal equipment with its own switching array within a line terminal group, the same internal connections are made which connect the subordinate switching network of its own line terminal group with the terminal equipment of the partner line terminal group in a switching operation, and with regard to such intra-connections are made connecting a line terminal group's own link terminating circuits with its own subordinate switching array within one line terminal group, likewise the same intraconnections that connect the subordinate switching array of one line terminal group to the link connection circuits of the respective partner line terminal group in a switching operation.

2. A circuit arrangement according to claim 1, characterized in that the clock pulse supply equipment assigned to the terminal equipment of the line terminal group with the decentralized control system that is out of operation receives its master clock pulse from the decentralized control system of the partner line terminal group in a switching operation.

3. A circuit arrangement according to claim 1, characterized in that the internal connections and the intra-connections in the terminal equipment, on the subordinate switching array and in the link connection circuit are each provided with a compensating memory and said compensating memory serves the purpose of intermediate storage of the respective transmitted information at the reception end for the purpose of matching the clock pulse systems within the terminal equipment, the subordinate switching networks and the link connection circuits.

4. A circuit arrangement according to claim 1, characterized in that within one line terminal group pair, control lines run from the decentralized control system to the terminal equipment and the link connection circuits not only of its own line terminal group but also to those of the partner line terminal group and said control lines are designed as point-to-point connections.

5. A circuit arrangement according to claim 4, characterized in that the control lines are equipped with gate circuits at the reception end in the terminal equipment and in the link connection circuits and said gate circuits can be controlled by the decentralized control system of the respective line terminal group.

* * * * *